ies Patent Office 3,600,409
Patented Aug. 17, 1971

3,600,409
PROCESS FOR SYNTHESIZING HEXAFLUORO-PROPYLENE EPOXIDE
Alwin S. Milian, Jr., and Paul R. Resnick, Wilmington, Del., assignors to E. I. du Pont de Nemours and Company, Wilmington, Del.
No Drawing. Filed Apr. 9, 1968, Ser. No. 719,851
Int. Cl. C07d 1/08
U.S. Cl. 260—348.5                                4 Claims

ABSTRACT OF THE DISCLOSURE

In the oxidation of hexafluoropropylene to hexafluoropropylene epoxide, hexafluoroacetone is also formed, which formation can be substantially eliminated by addition of a small amount of neutral inert aromatic compound to the reaction zone.

---

This invention is directed to a process for oxidizing hexafluoropropylene to hexafluoropropylene epoxide and more particularly, to an improvement therein wherein the formation of hexafluoroacetone is reduced.

Oxidation of hexafluoropropylene to hexafluoropropylene epoxide is disclosed in British Pat. Nos. 931,587 and 1,034,492. Various other products are produced by the reaction, such as under certain conditions hexafluoroacetone, which represents a yield loss of hexafluoropropylene epoxide.

The present invention provides an improvement in these processes in the sense that the amount of hexafluoroacetone formed is reduced, thereby increasing the yield of hexafluoropropylene epoxide. This improvement is obtained by adding to the reaction zone a neutral inert aromatic compound. Surprisingly, the $C_3F_6O$ reaction product of the oxidation process, which may contain as much as 20 percent by weight of hexafluoroacetone (the remainder being hexafluoropropylene epoxide), shows an increase in content of hexafluoropropylene epoxide to as much as 99 percent by weight and higher when the improved process of this invention is used.

The improvement process of the present invention is generally applicable to processes for oxidizing hexafluoropropylene to hexafluoropropylene epoxide, such as described in the above-mentioned British patents, under conditions which lead to the formation of hexafluoroacetone. To summarize the preferred oxidation process, hexafluoropropylene in the presence of an inert liquid or gaseous diluent is contacted and reacted with oxygen under conditions of elevated temperature and super-atmospheric pressure, followed by recovering hexafluoropropylene epoxide from the reaction zone. The reaction temperatures can be from 130 to 250° C., but preferably are from 140 to 175° C. and the reaction pressures can be from above atmospheric pressure, e.g., at least 100 p.s.i.g., up to about 700 p.s.i.g., which is obtained by the oxygen feed to the reaction zone plus autogeneous pressure. The concentration of hexafluoropropylene in the diluent can be from 1 to 50 percent by weight, but preferably is from 5 to 30 percent by weight. A stoichiometric excess of oxygen is generally used, and the oxygen feed can contain an inert gas diluent such as nitrogen. Preferred diluents are those which are liquid at the reaction conditions employed and in which the hexafluoropropylene is soluble. Suitable such liquid diluents (solvents) which are inert to the reactants and reaction products are perfluorodimethylcyclobutane, fluorotrichloromethane, trichlorotrifluoroethane, carbon tetrachloride, perfluoroalkyl tertiary amine, and perfluorinated ethers. The additional inert diluents described in U.S. patent application Ser. No. 659,816, filed Aug. 10, 1967, by Carlson can be used. The reaction can be conducted either continuously or batchwise. Generally, stainless steel equipment is used for conducting the reaction. The preferred procedure for recovering hexafluoropropylene from the reaction zone is disclosed in U.S. Pat. No. 3,326,780 to Wiist.

According to the present invention, an amount of neutral inert aromatic compound which is effective to inhibit the formation of hexafluoroacetone is added to the reaction zone during the oxidation process. By "neutral" is meant that the compound is neither acid nor base, since acids and bases are known to rearrange hexafluoropropylene epoxide as disclosed in U.S. Pat. No. 3,321,515 to Moore and Milian. By "inert" is meant that the compound does not inhibit the oxidation reaction. Thus, for example, the aromatic compound should be free of aliphatic, carboxylic, amine, hydroxylic or thiolitic hydrogen atoms. With due regard for these parameters, the compounds can be, in terms of aromatic nuclei, mono-nuclear or poly-nuclear, including condensed ring compounds. Representative aromatic compounds include benzene, which is preferred, nitrobenzene, halogen (preferably bromine, chlorine, or fluorine) substituted benzene such as hexafluorobenzene, dichlorobenzene, and bromobenzene, naphthalene, anthracene, biphenyl and the phenyl ethers, such as diphenyl ether and polyphenylene ether.

Only small amounts of aromatic compound are necessary to provide the inhibitive effect, generally less than 0.05 (500 p.p.m.) percent by weight based on the weight of liquid in the reaction zone. The actual amount of aromatic compound used, however, will depend on the particular aromatic compound employed and the degree of hexafluoroacetone inhibition desired, which will generally be to reduce the amount of hexafluoroacetone present in the $C_3F_6O$ reaction product to at least in half and to a content of less than 5 percent by weight therein. The amount added should not be so great as to adversely affect the oxidation reaction. Typically, the amount of aromatic compound added will be sufficient to provide a concentration of at least 5 p.p.m. (same weight basis as above) in the reaction zone. The aromatic compound can be added either batchwise in larger increments or continuously to provide the amount of aromatic compound in the reaction zone desired.

Hexafluoropropylene epoxide, which is obtainable by the improved process of the present invention, is useful such as in the manner disclosed in the following U.S. Pat. Nos. 3,358,003, 3,326,984, 3,321,515, 3,274,239, 3,338,978, and 3,322,826.

In the following examples of the present invention, parts and percents are by weight unless otherwise indicated.

EXAMPLE 1

An autoclave is provided with an inlet for oxygen and an inlet for 1,1,2-trichloro-1,2,2-trifluoroethane solvent containing dissolved hexafluoropropylene, a distilling column for separating hexafluoropropylene epoxide from the effluent from the autoclave, and a solvent tank for collecting solvent and recycling it to the autoclave. The equipment is 316 stainless steel, and the autoclave and solvent tank plus connecting lines have a total volume of about 80 gallons. The reaction is conducted continuously at an autoclave temperature of 160° C. and at a total pressure of 400 p.s.i.g. The molar ratio of oxygen feed to hexafluoropropylene feed was 0.6, and the concentration of hexafluoropropylene in the total amount of solvent added to the autoclave was 9.6 percent. Analysis of the crude product stream from the top of the distilling column showed that 19.5 percent of the $C_3F_6O$ distillate was hexafluoroacetone. Four additions of 5 cc. of benzene each 15 minutes to the recirculating solvent, providing a concentration of about 40 p.p.m. of benzene, resulted in a decrease in the amount of hexafluoroacetone formed and corresponding increase in the amount of hexafluoropropylene epoxide obtained. The amount of hexafluoroacetone present in the crude product stream from the top of the distilling column leveled off at about 1.7 percent for a period in excess of 8 hours.

EXAMPLES 2 to 8

A solution of 20 percent pure hexafluoropropylene epoxide in 380 cc. of trichlorotrifluoroethane was passed at a constant rate through a 500 ft. coil of 1/8 inch 304 stainless steel tubing (0.055 in I.D.) heated by an oil bath at 160° C. The contents of the coil were maintained under a pressure of 400 p.s.i.g. Residence time within the coil was 35 minutes. Gas chromatographic analysis of the effluent from the coil showed that 99 percent hexafluoroacetone was present.

This experiment was repeated, adding 20 cc. of an aromatic compound to the trichlorotrifluoroethane prior to passage through the coil for each repetition so as to demonstrate the effectiveness of a number of aromatic compounds to inhibit the formation of hexafluoroacetone under conditions which favored its formation. The compounds used and results are shown in the following table:

| Example | Aromatic compound | Percent hexafluoroacetone in effluent |
|---|---|---|
| 2 | None | 99 |
| 3 | Diphenyl ether | 1 |
| 4 | Benzene | 5 |
| 5 | Nitrobenzene | 15 |
| 6 | Biphenyl | 51 |
| 7 | Hexafluorobenzene | 33 |
| 8 | Ortho-dichlorobenzene | 57 |

It is believed that the hexafluoroacetone is formed by rearrangement of some of the hexafluoropropylene epoxide and that the aromatic compound inhibits this rearrangement. The rearrangement is believed caused by reactive sites on the surface of equipment used to synthesize the epoxide by the oxidation process, and the aromatic nucleus (or nuclei) of the aromatic compound has a deactivating effect on these sites.

As many apparently widely different embodiments of this invention may be made without departing from the spirit and scope thereof, it is to be understood that this invention is not limited to the specific embodiments thereof except as defined in the appended claims.

What is claimed is:

1. A process for synthesizing hexafluoropropylene epoxide wherein hexafluoroacetone is also formed, comprising contacting and reacting under superatmospheric pressure at a temperature of from 130 to 250° C. oxygen with hexafluoropropylene contained in an inert liquid diluent containing from 5 to 500 p.p.m. of benzene, nitrobenzene, bromine-, chlorine-, or fluorine-substituted benzene, naphthalene, anthracene, biphenyl, or phenyl ether, and obtaining hexafluoropropylene epoxide and diminished formation of hexafluoroacetone as a result thereof.

2. The process of claim 1 wherein the 5 to 500 p.p.m. additive is benzene.

3. The process of claim 1 wherein the phenyl ether is diphenyl ether.

4. The process of claim 1 wherein the contacting and reacting step is carried out in stainless steel equipment.

References Cited

UNITED STATES PATENTS 3,071,601   1/1963   Aries _____ 260—348.5
3,442,942   5/1969   Sianesi et al. _____ 260—348.5X NORMA S. MILESTONE, Primary Examiner U.S. Cl. X.R.

260—348.5V